(12) United States Patent
Tajima et al.

(10) Patent No.: US 12,067,297 B2
(45) Date of Patent: Aug. 20, 2024

(54) STORAGE SYSTEM AND DATA LAYOUT CONVERSION METHOD IN STORAGE SYSTEM

(71) Applicant: Hitachi, Ltd., Tokyo (JP)

(72) Inventors: Sachie Tajima, Tokyo (JP); Hideo Saito, Tokyo (JP); Takaki Nakamura, Tokyo (JP); Shintaro Ito, Tokyo (JP); Naruki Kurata, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/180,660

(22) Filed: Mar. 8, 2023

(65) Prior Publication Data
US 2023/0401010 A1 Dec. 14, 2023

(30) Foreign Application Priority Data

Jun. 13, 2022 (JP) .................. 2022-095168

(51) Int. Cl.
*G06F 12/00* (2006.01)
*G06F 3/06* (2006.01)

(52) U.S. Cl.
CPC ........... *G06F 3/0661* (2013.01); *G06F 3/061* (2013.01); *G06F 3/067* (2013.01)

(58) Field of Classification Search
CPC ........ G06F 3/0661; G06F 3/061; G06F 3/065; G06F 3/067; G06F 11/1446; G06F 11/1471
See application file for complete search history.

(56) References Cited

U.S. PATENT DOCUMENTS

| 6,615,327 B1 * | 9/2003 | Satoyama ........... G06F 11/1456 714/6.32 |
| 2002/0152415 A1 * | 10/2002 | Franklin ............... G06F 3/0689 714/6.22 |
| 2022/0100616 A1 | 3/2022 | Ito et al. |

FOREIGN PATENT DOCUMENTS

JP 2022-055102 A 4/2022

* cited by examiner

*Primary Examiner* — Shawn X Gu
(74) *Attorney, Agent, or Firm* — Volpe Koenig

(57) ABSTRACT

Disclosed is a storage system that performs a drive data layout change while maintaining I/O functionality. The storage system creates a redundancy group for forming a redundant configuration of data to be stored in a storage drive, and stores data of the redundancy group in a plurality of the storage drives. A processor in a storage node discards data stored in a unit storage area, recovers the discarded data according to a changed data format, and re-stores the recovered data in the storage drive. The processor in the storage node performs an I/O process on the data to be discarded during a data format change, by achieving recovery based on the data of the redundancy group that is stored in an area other than the unit storage area where the data format is to be changed.

9 Claims, 14 Drawing Sheets

FIG. 5

CHUNK STATE MANAGEMENT TABLE 260

| | D1 | D2 | D3 | D4 | D5 | D6 | NEW D6 |
|---|---|---|---|---|---|---|---|
| P1 | OLD | UNUSED | OLD | OLD | OLD | CONVERSION FROM OLD IN PROGRESS | UNUSED |
| P2 | OLD | OLD | OLD | OLD | OLD | UNUSED | CONVERSION TO NEW IN PROGRESS |
| P3 | OLD | OLD | UNUSED | UNUSED | UNUSED | UNUSED | UNUSED |

MAPPING TABLE 250

|  | D1 | D2 | D3 | D4 | D5 | D6 |
|---|---|---|---|---|---|---|
| P1 | L11 | L33 | L12 | L22 | L13→L23 | L31 |
| P2 | L12 | L32 | L21 | L11 | L21→L32 | L23→L13 |
| P3 | L13 | L22 | L32 | L23 | L33 | L32→L21 |

FIG. 8C

CHUNK STATE MANAGEMENT TABLE 260

|    | D1  | D2     | D3     | D4     | D5              | D6                      |
|----|-----|--------|--------|--------|-----------------|-------------------------|
| P1 | OLD | UNUSED | OLD    | OLD    | OLD → UNUSED    | UNUSED                  |
| P2 | OLD | OLD    | OLD    | OLD    | OLD → UNUSED    | UNUSED → OLD (OR NEW)   |
| P3 | OLD | OLD    | UNUSED | UNUSED | UNUSED          | UNUSED → OLD (OR NEW)   |

FIG. 9

STATE MANAGEMENT TABLE 260B

| D1 | D2 | D3 | D4 | D5 | D6 |
|---|---|---|---|---|---|
| OLD | OLD | OLD | OLD | OLD → UNUSED | UNUSED → OLD (OR NEW) |

FIG. 12

STATE MANAGEMENT TABLE 260C

|  | STORAGE NODE 1 | | STORAGE NODE 2 | | STORAGE NODE 3 | |
|---|---|---|---|---|---|---|
|  | D1 | D2 | D3 | D4 | D5 | D6 |
| P1 | ... | | ... | | ... | |
| P2 | ... | | | | | |
| p3 | ... | | | | | |

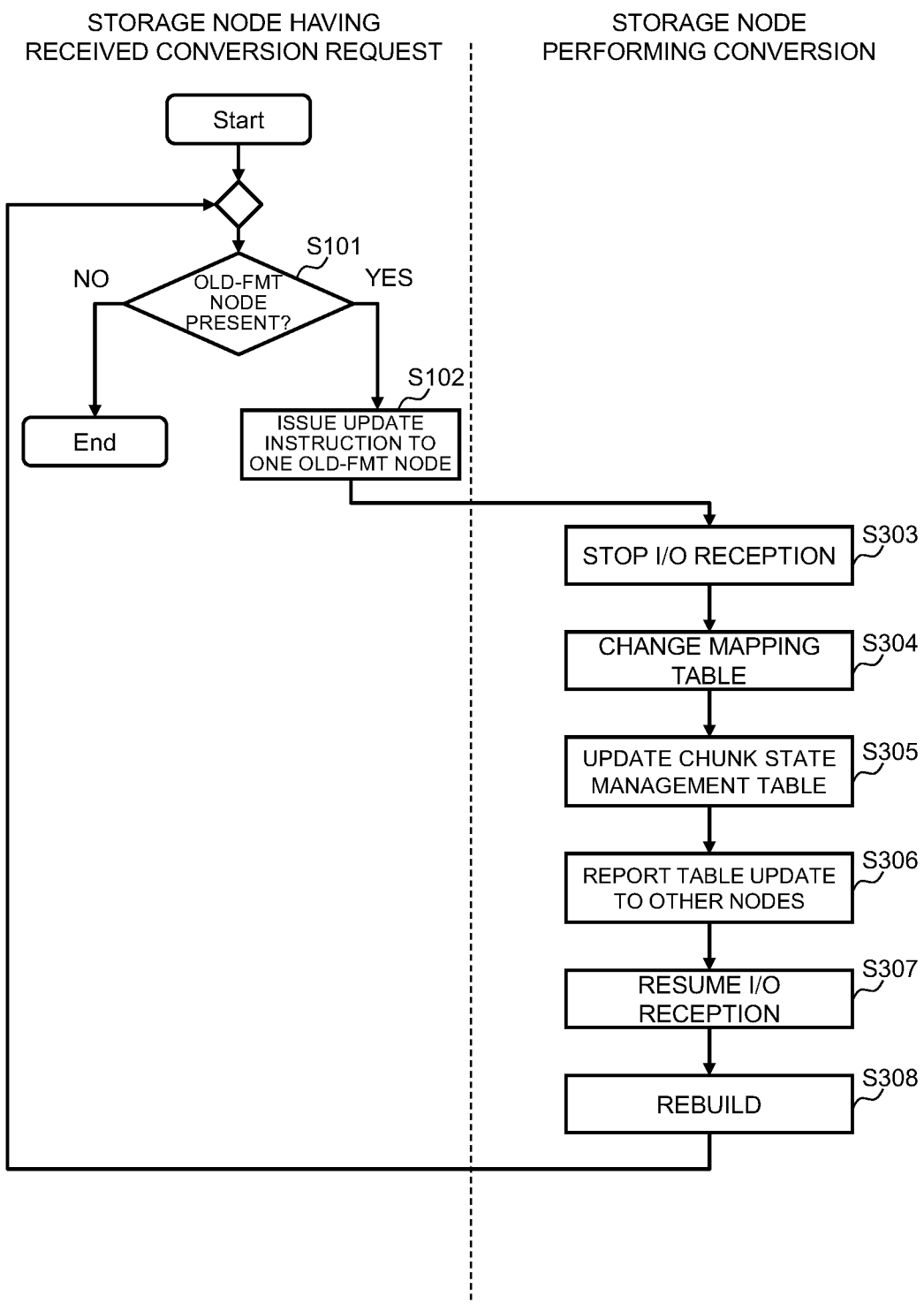

STORAGE SYSTEM AND DATA LAYOUT CONVERSION METHOD IN STORAGE SYSTEM

BACKGROUND OF THE INVENTION

1. Field of the Invention

The present invention relates to a storage system and to a data layout conversion method in a storage system.

2. Description of the Related Art

As described in Japanese Patent Laid-open No. 2022-55102, a storage program running in a software-defined storage (SDS), which is a storage device, has information regarding a data layout in a drive that is used at the time of storing user data in a self-recognized drive.

SUMMARY OF THE INVENTION

In a case where the storage program uses a new function, a drive data layout may require a format change. Meanwhile, the SDS needs to continuously provide an input/output (I/O) function unless an explicit stop instruction is issued by a user. Therefore, even in a case where a function is added such that the drive data layout requires a format change, the I/O function needs to continuously be provided to the user.

The drive data layout is determined at the time when the storage program recognizes a drive in which the user data is to be stored. In a case where the drive data layout subsequently requires a format change, it is demanded that the format change be followed while maintaining the access to the user data already stored in a layout based on an old format.

In view of the above circumstances, the present invention has been made to achieve performance improvement, quality enhancement, and function addition requiring a drive data layout change while maintaining I/O functionality in a storage system.

In order to address the above-described problem, according to an aspect of the present invention, there is provided a storage system including a plurality of nodes. The nodes each include a storage drive and a processor. The processor processes data that is to be stored in the storage drive in response to an I/O request from a host. The processor included in the node creates a redundancy group for forming a redundant configuration of data to be stored in the storage drive, and stores data of the redundancy group in a plurality of the storage drive. When changing a data format of a unit storage area, the processor included in the node discards data stored in the unit storage area where part of the data of the redundancy group is stored, then based on the data of the redundancy group that is stored in an area other than the unit storage area where the data format is to be changed, recovers the discarded data according to a changed data format and re-stores the recovered data in the storage drive, and performs an I/O process on the data to be discarded during the data format change, by achieving recovery based on the data of the redundancy group that is stored in an area other than the unit storage area where the data format is to be changed.

The present invention makes it possible, for example, to achieve performance improvement, quality enhancement, and function addition requiring a data layout change while maintaining I/O functionality in a storage system.

BRIEF DESCRIPTION OF THE DRAWINGS

FIG. 5 is a diagram illustrating a chunk state management table according to the first embodiment;

FIG. 8C is a diagram illustrating the chunk state management table in a state where the drive data layout conversion is performed on an individual drive basis, according to the second embodiment;

FIG. 9 is a diagram illustrating a state management table according to a modification;

FIG. 12 is a diagram illustrating the state management table according to a modification; and FIG. 13 is a flowchart illustrating the drive data layout conversion process that is performed on an individual storage node basis, according to the third embodiment.

DETAILED DESCRIPTION

Figure 1:
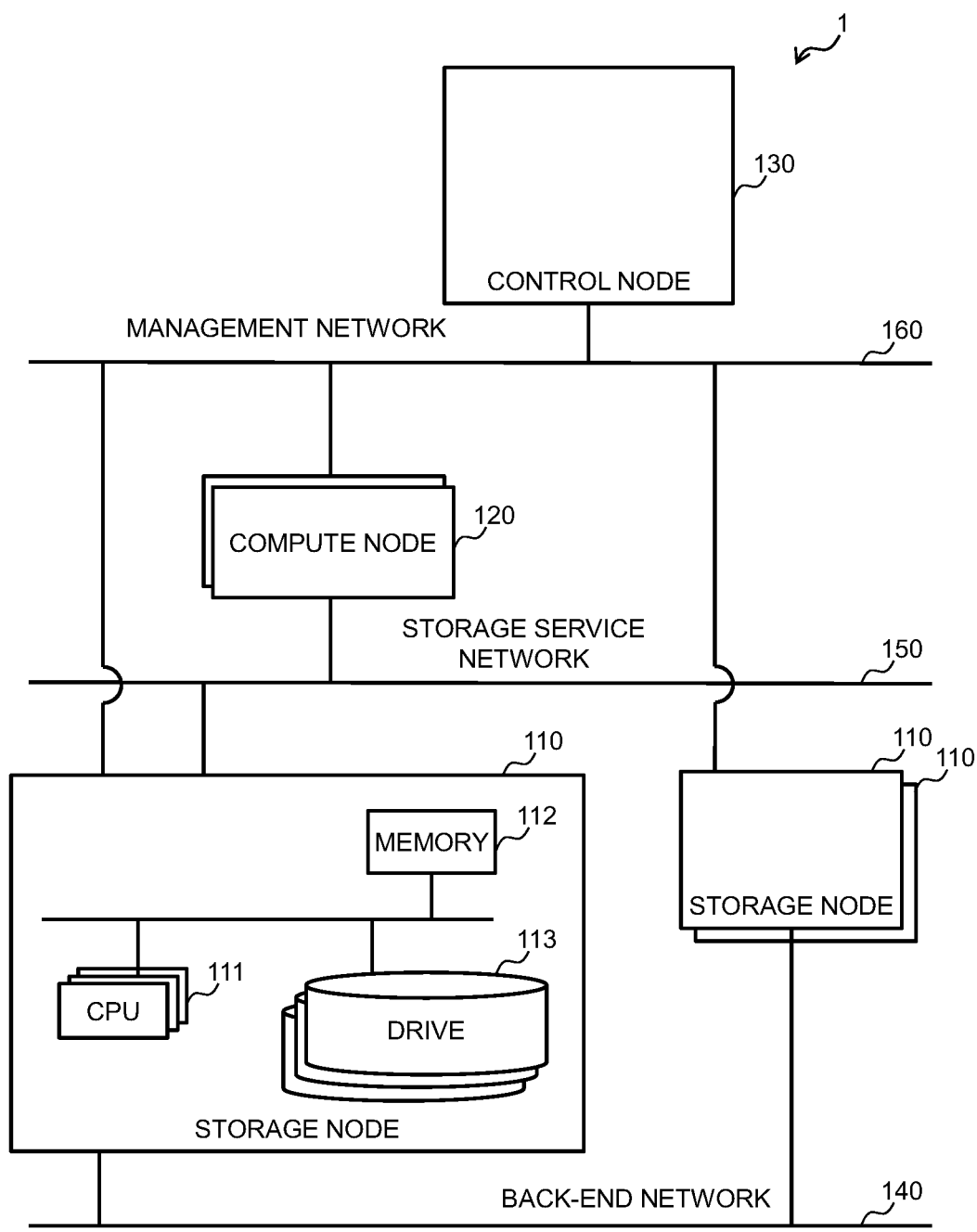
FIG. 1 is a diagram illustrating a configuration of a storage system according to a first embodiment of the present invention.

Embodiments of the present invention will now be described with reference to the accompanying drawings. The embodiments described below and the accompanying drawings are merely illustrative, and not restrictive, of the present invention, and are simplified or omitted as needed for clarity of the description. The present invention may be implemented by various other embodiments. Unless otherwise stated, the number of individual components described in conjunction with the embodiments may be either one or more.

In a case where there are a plurality of components having an identical or similar function, they may be described with different additional characters appended to the same reference numeral. Meanwhile, in a case where the plurality of such components need not be distinguished from each other, they may be described with the additional characters omitted.

Further, the components identical or similar to those described in conjunction with an already described embodiment or modification may be omitted from the description in order to mainly describe differences. Furthermore, the components identical or similar to those described in conjunction with an already described embodiment or modification may be designated by the same reference numeral as the corresponding components in order to avoid redundant description.

In the following description of the embodiments, a process performed by executing a program is described in some cases. In such cases, a computer performs the process defined by the program while allowing a processor (e.g., a central processing unit (CPU) or a graphics processing unit (GPU)) to use, for example, a storage resource (e.g., a memory) and an interface device (e.g., a communication port). Therefore, the processor may act as a main element that performs the process by executing the program. Likewise, the main element configured to perform the process by executing the program may be a controller, apparatus, system, calculator, or node having the processor. The main element configured to perform the process by executing the program should be an arithmetic section, and may include a dedicated circuit configured to perform a specific process. Here, the dedicated circuit is, for example, a field-programmable gate array (FPGA), an application-specific integrated circuit (ASIC), or a complex programmable logic device (CPLD).

The program may be installed in a calculator from a program source. The program source may be a non-transitory storage medium that can be read by a program distribution server or the calculator. In a case where the program distribution server is adopted as the program source, the program distribution server may include the processor and the storage resource storing the program for distribution, and the processor included in the program distribution server may distribute the program for distribution to another calculator. Further, in the embodiments, two or more programs may be implemented as one program, and one program may be implemented as two or more programs.

In the description of the following embodiments, various kinds of information are presented in tabular form. However, the various kinds of information may be in a form other than a table.

First Embodiment (Configuration of Storage System 1)

FIG. 1 is a diagram illustrating a configuration of a storage system 1 according to a first embodiment of the present invention. The storage system 1 includes three or more storage nodes 110, one or more compute nodes 120, and one control node 130. Further, the storage system 1 includes a back-end network 140, a storage service network 150, and a management network 160. The back-end network 140 interconnects the storage nodes 110. The storage service network 150 connects the storage nodes 110 and the compute nodes 120. The management network 160 connects the control node 130, the compute nodes 120, and the storage nodes 110.

Some or all of the storage nodes 110, the compute nodes 120, and the control node 130 may be identical computer equipment. Some or all of the back-end network 140, the storage service network 150, and the management network 160 may be identical networks.

The storage nodes 110 each include one or more CPUs 111, a memory 112, and one or more drives 113.

The control node 130 is computer equipment that a system administrator uses in order to manage the storage system 1. The control node 130 is able to get a plurality of storage nodes 110 together and manage them as a group called a cluster. In the example depicted in FIG. 1, one cluster is formed. However, a plurality of clusters may be formed in the storage system 1.

(Configuration of Memory 112 in Storage Node 110)

Figure 2:
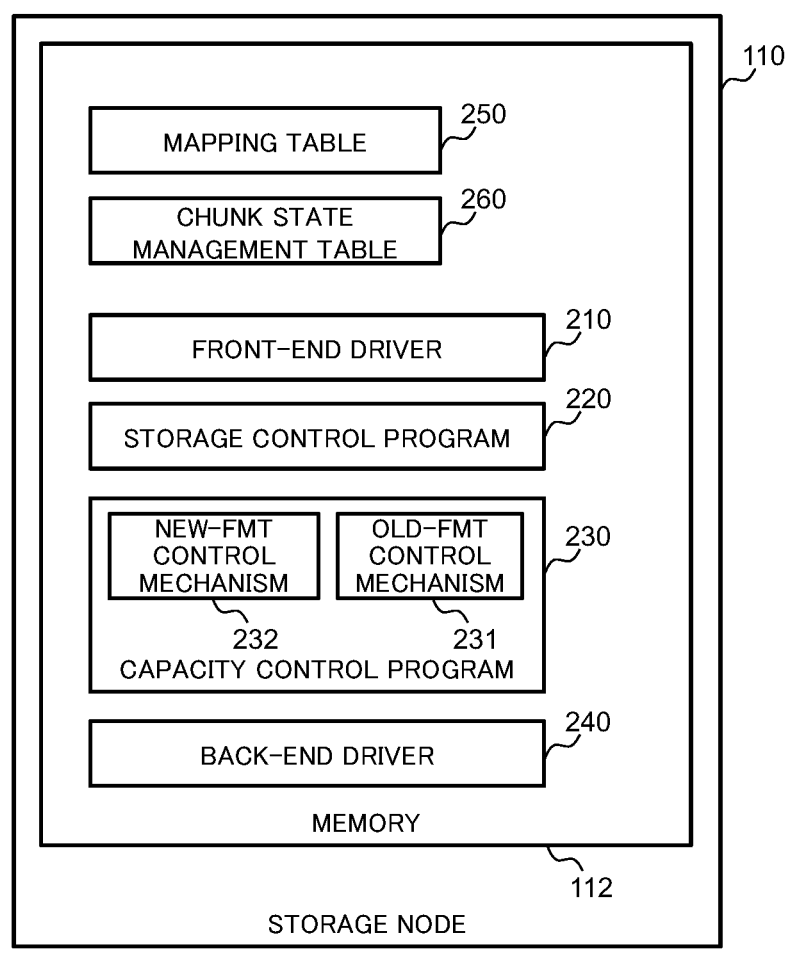
FIG. 2 is a diagram illustrating a configuration of software that is stored in a memory of a storage node according to the first embodiment.

FIG. 2 is a diagram illustrating a configuration of software stored in the memory 112 of each storage node 110. The memory 112 of each storage node 110 stores a front-end driver 210, a back-end driver 240, a storage control program 220, and a capacity control program 230. The capacity control program 230 includes an old-format control mechanism 231 and a new-format control mechanism 232. Formats may each be hereinafter referred to as the FMT.

Further, the memory 112 includes a mapping table 250 and a chunk state management table 260.

The storage control program 220 and other storage control programs 220 disposed in other storage nodes 110 are managed together as a redundancy group for forming a redundant configuration.

The redundancy group is set in such a manner that one storage control program 220 receives I/Os from the compute nodes 120, and that the remaining storage control programs 220 do not receive the I/Os. A state where I/Os are to be received is hereinafter referred to as being active, and a state where the I/Os are not to be received is hereinafter referred to as being standby. Further, a storage control program 220 set to be active is hereinafter referred to as the active storage control program, and a storage control program 220 set to be standby is hereinafter referred to as the standby storage control program.

The redundancy group is such that, in a case where a fault occurs in the active storage control program, the setting of the active storage control program is changed to standby, and the setting of the standby storage control program is changed to active. Additionally, in a case, for example, where a fault occurs in a storage node 110 where the active storage control program is disposed, the setting of the active storage control program is changed from active to standby, and the setting of the standby storage control program is changed from standby to active.

Consequently, in the redundancy group including the active storage control program, failover occurs from the active storage control program to the standby storage control program. That is, an I/O process that has been performed by a faulty active storage control program is taken over by a storage control program 220 whose setting is changed from standby to active.

The capacity control program 230 assigns a physical storage area of a drive 113 included in a storage node 110 to the redundancy group. When the physical storage area of the drive 113 is assigned to the redundancy group, the capacity control program 230 exchanges data with another capacity control program 230 of another storage node 110 belonging to the redundancy group through the back-end network 140. Via the capacity control program 230, the active storage control program performs I/O to the storage area belonging to the redundancy group, according to an I/O command.

Data Storage and Mapping Table 250 in First Embodiment

Figure 3:
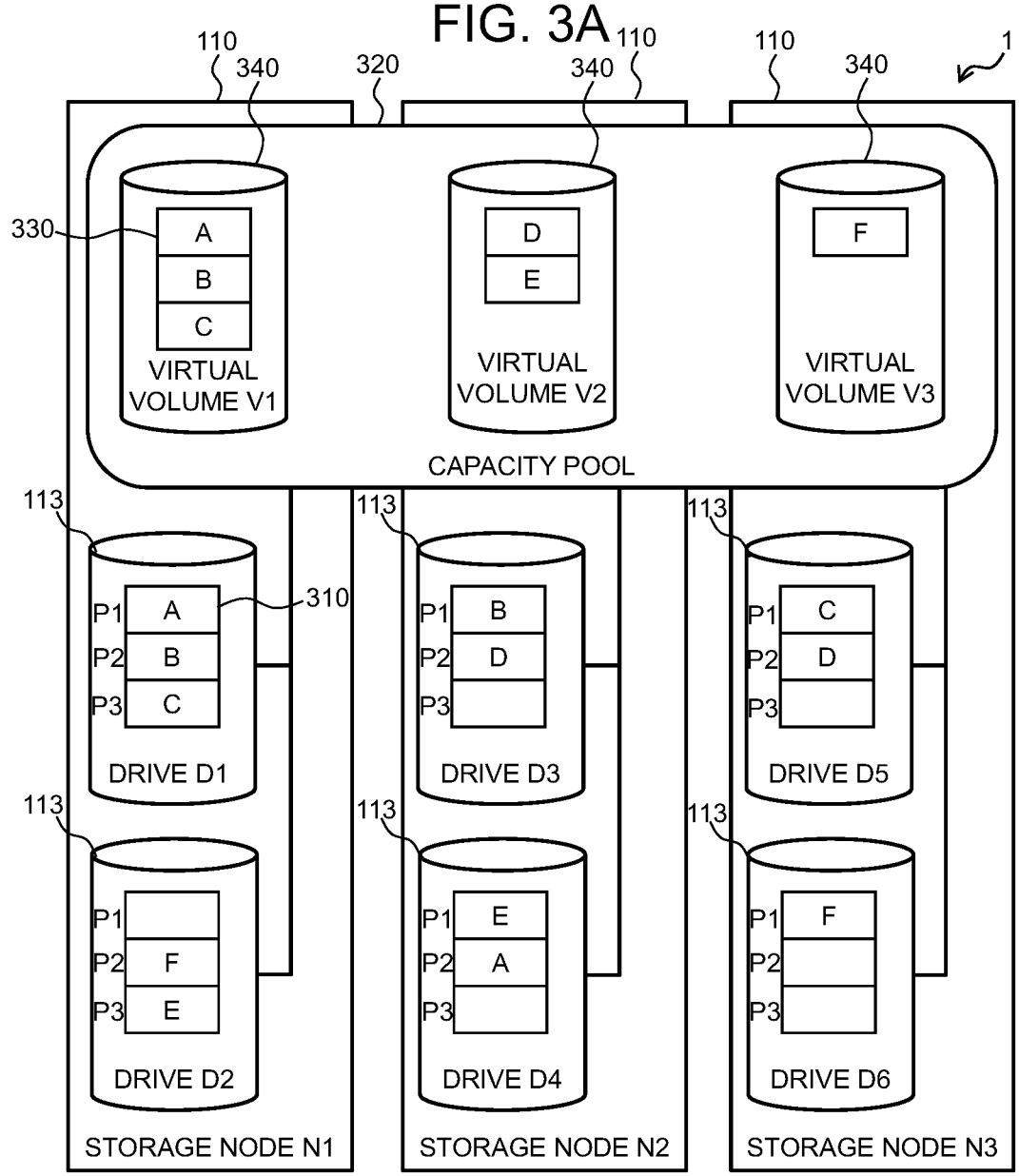
FIG. 3A is a diagram illustrating how data is stored in the storage system according to the first embodiment.
FIG. 3B is a diagram illustrating a mapping table according to the first embodiment.

FIG. 3A is a diagram illustrating how data is stored in the storage system 1 according to the first embodiment. FIG. 3B is a diagram illustrating the mapping table 250 of the storage system 1 according to the first embodiment.

The capacity control program 230 manages the physical storage area provided by a drive 113 included in a storage node 110 by dividing it into physical storage areas of a predetermined size. The resulting physical storage areas of the predetermined size are hereinafter referred to as the physical chunks 310.

In FIG. 3A, for example, the physical chunks 310 are the physical storage areas that are obtained when the storage areas provided by the respective drives 113 (drives D1 to D6) included in each of the storage nodes 110 (storage nodes N1 to N6) are divided into three parts.

The capacity control program 230 creates a capacity pool 320 for each redundancy group. Logical storage areas equal in size to the physical chunks 310 are assigned to the capacity pool 320. The logical storage areas are hereinafter referred to as the logical chunks 330. The physical chunks 310 are associated with the logical chunks 330 according to redundancy. When drives 113 usable in the redundancy group are assigned to the capacity pool 320, the capacity control program 230 determines links between the physical chunks 310 and the logical chunks 330.

For example, the capacity control program 230 creates the capacity pool 320 that links to each redundancy group. The logical chunks 330 equal in size to the physical chunks 310 are assigned to the capacity pool 320. The links between the physical chunks 310 and the logical chunks 330 are managed by the mapping table 250.

As depicted in FIG. 3B, the mapping table 250 stores information that identifies the logical chunks 330 linking to the physical chunks 310, which are identified by information 350 for identifying the drives 113 assigned to the capacity pool 320 and information 360 for identifying the locations in the drives 113.

For example, a "drive 113 identified by D1" is hereinafter referred to as the "drive D1." Further, for example, a "logical chunk 330 identified by L11" is hereinafter referred to as the "logical chunk L11." Furthermore, for example, a "physical chunk 310 stored at a location identified by P1 in a drive 113" is hereinafter referred to as the "physical chunk P1."

For example, information 371 stored in the mapping table 250 indicates that the logical chunk L11 is linked to the physical chunk P1 of the drive D1. Further, information 372 indicates that the logical chunk L11 is also linked to the physical chunk P2 of the drive D4.

One or more virtual logical volumes having the logical chunks 330 (hereinafter referred to as the virtual volumes 340) are defined for the capacity pool 320. The virtual volumes 340 are provided to the compute nodes 120.

A processing flow for writing data from a compute node 120 to a virtual volume 340 will now be described. The compute node 120 transmits, to one of the storage nodes 110 in a cluster, a write request and write data that specify an identifier of the virtual volume 340 at a data write destination and address information identifying the data write destination in the virtual volume 340.

The front-end driver 210 of the storage node 110, which has received the write request and the write data, transfers the write request and the write data to the front-end driver 210 of a storage node 110 where the active storage control program associated with the write target virtual volume 340 specified by the write request is disposed.

The front-end driver 210 having received the transferred write request and write data transmits the write request and the write data to a storage control program 220 that is associated, through the capacity pool 320, with the write target virtual volume 340 specified by the write request.

The active storage control program included in the storage control program 220 having received the write request and the write data assigns, as needed, one of the logical chunks 330 forming the capacity pool 320 associated with the virtual volume 340 to a write destination area in the write target virtual volume 340.

Further, the active storage control program converts the address of the write destination area in the write target virtual volume 340 specified by the write request to a chunk number and an offset location that identify the logical chunk 330 assigned to the write destination area. The active storage control program generates an I/O command by using the information obtained by the conversion, and transmits the generated I/O command and the write data to the capacity control program 230 in the local storage node 110.

Upon receiving the I/O command and the write data, the capacity control program 230 stores the data at the offset location in the drive 113 that corresponds to the physical chunk 310 associated with the logical chunk 330 specified by the I/O command.

In the storage system 1, the write data from the compute node 120 is redundantly stored in a plurality of physical chunks 310 assigned to the corresponding logical chunks 330. The number of physical chunks 310 to be assigned to the logical chunks 330 is determined by the settings of a redundancy method. Mirroring (user data replication), erasure coding, multi-stage erasure coding (MEC), and various other redundancy methods are available. As many physical chunks 310 as needed for implementing a selected redundancy method are associated with one logical chunk 330.

When a plurality of physical chunks 310 are associated with one logical chunk 330, the data is redundantly stored in the plurality of physical chunks 310. In this instance, one of the plurality of physical chunks 310 is set as a master, and the other physical chunks 310 are set as mirrors. In a case where a read request is issued by the compute node 120, the data is read from the physical chunk 310 that is set as the master. Further, in a case where erasure coding or MEC is used for redundancy purposes, a plurality of physical chunks 310 are associated with one logical chunk 330, and master data and redundant data having a predetermined pattern are stored in the plurality of physical chunks 310.

(Format Conversion Requiring Drive Data Layout Conversion)

Figure 4:
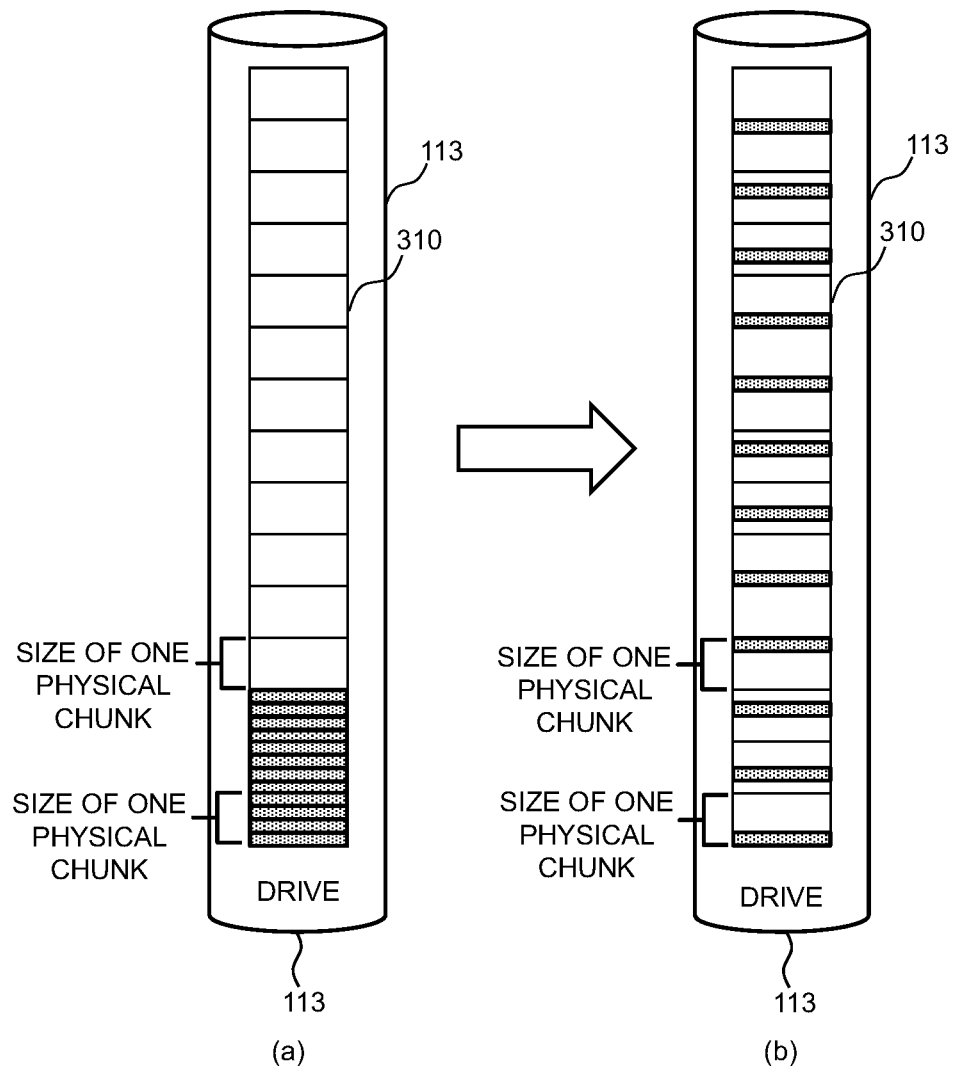
FIG. 4 is a diagram illustrating a format conversion requiring a drive data layout conversion according to the first embodiment.

FIG. 4 is a diagram illustrating a format conversion that requires a drive data layout conversion. The storage system 1 may occasionally make a drive data format change that requires a layout change of the physical chunks 310 of the drive. In order to explain a format change requiring a layout change, the following describes an example of changing a warranty code holding method (storage format).

The SDS may occasionally store a warranty code generated from user data in the drive 113 for the purpose of protecting the user data stored in the drive. The user data and the warranty code can separately be stored after being organized into a size equal to or larger than the size of a physical chunk 310 or into a size equal to or smaller than the size of the physical chunk 310 ((a) of FIG. 4), or can successively be stored for the individual physical chunks 310 ((b) of FIG. 4). Gains and losses in I/O performance and data integrity strength of the SDS vary depending on the presence of the warranty code and on an adopted storage method. When the presence of the warranty code or the storage method employed by a currently used SDS is changed upon receipt of a request from the user, the data format of the drive 113 changes. Therefore, the layout of the physical chunks 310 of the drive is changed accordingly.

In some other cases, new functions may be provided by an update of the storage system 1, or unused functions may newly be used due to changes in the settings of the storage system 1. In a case where the newly used functions require the storage of metadata used by a program in the SDS on the drive, the data format of the drive is changed in order to start using the new functions. The format of the data of the drive is also changed in a case, for example, where the use of new functions or the extension of functions newly requires a user data write log or entails a change in the storage format (log size or log format).

Likewise, a change in the size of a physical chunk, deallocation of a certain area of the drive for another program (switching between coexistence and separation of system files and user data), allocation, resizing, and deallocation of a memory data save area may occur. In these cases, too, the format of the data of the drive is changed.

Meanwhile, in the storage system 1, the correspondence between the logical chunks 330 and the physical chunks 310 is determined at the time when a drive 113 included in the storage node 110 is assigned to the capacity pool 320. This correspondence is stored in the mapping table 250. Therefore, in a case where the layout of the physical chunks 310 of the drive 113 is to be changed, the mapping table 250 is changed while maintaining access to the user data.

Chunk State Management Table 260 According to First Embodiment

FIG. 5 is a diagram illustrating the chunk state management table 260 according to the first embodiment.

The chunk state management table 260 stores information regarding usage states of the physical chunks 310, which are identified based on drive information 410 regarding drives 113 assigned to the capacity pool 320 and on location information 420 identifying the locations of the physical chunks 310 of the drives 113.

Five different usage states can be set for the physical chunks 310, namely, "unused," "old," "new," "conversion from old in progress," and "conversion to new in progress." "Unused" indicates a state where the associated area is not used. "Old" indicates a state where an old format is used. "New" indicates a state where a new format is used. "Conversion from old in progress" indicates a state where a conversion from an old format to a new format is in progress. "Conversion to new in progress" indicates a state of a conversion destination. The number of columns of the drive information 410 correlates with the number of columns of the mapping table 250. In a case where map information is added to the mapping table 250, the map information regarding the associated area is added. In a case where the map information is deleted, the map information regarding the associated area is deleted.

For example, while a map conversion required for a layout conversion of the physical chunks 310 of the drive D6 is in progress, the mapping table 250 and the chunk state management table 260 have information 431 based on an old layout and information 432 based on a new layout.

(Drive Data Layout Conversion on Individual Chunk Basis)

Figure 6:
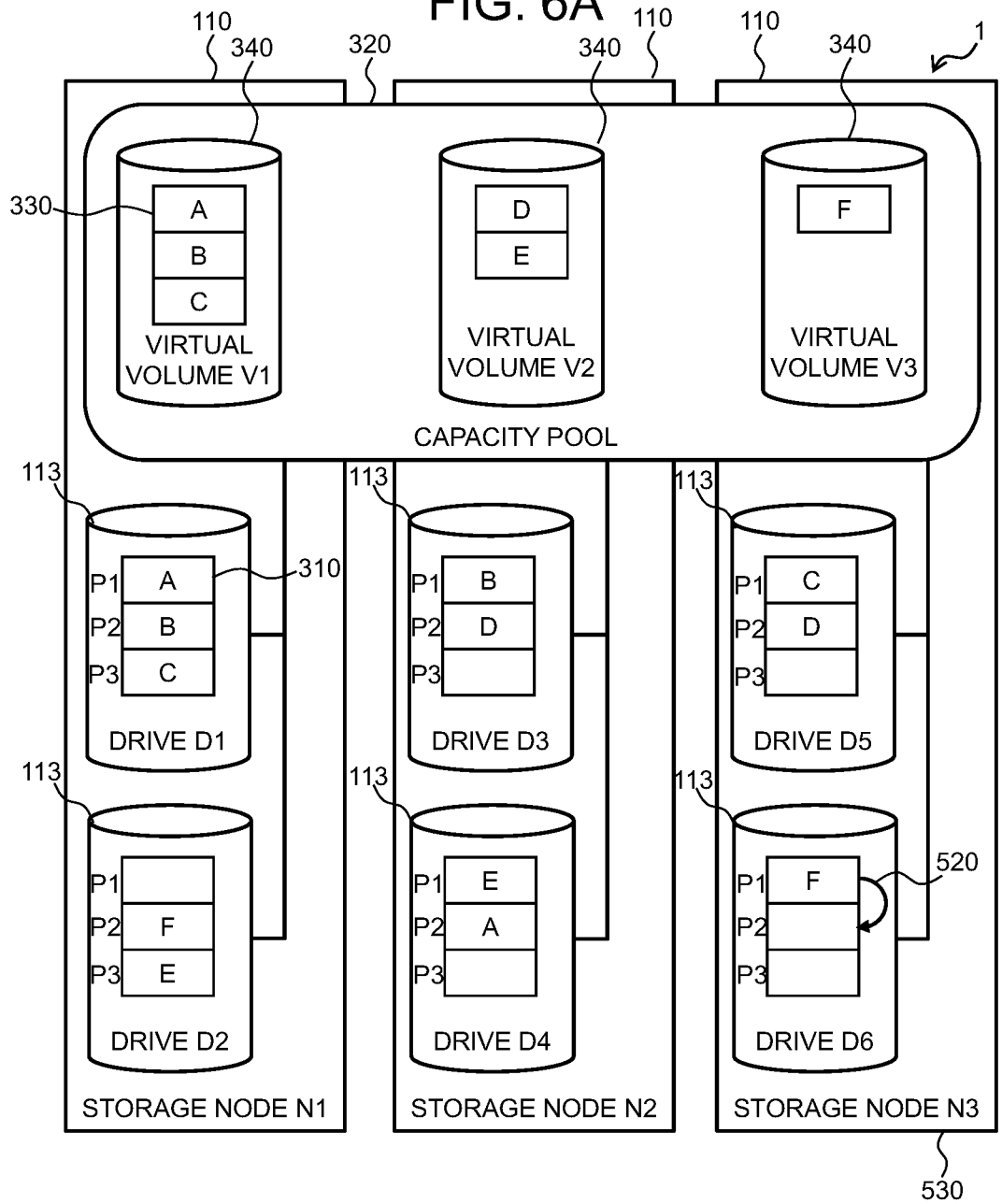
FIG. 6A is a diagram illustrating a drive data layout conversion that is performed on an individual chunk basis, according to the first embodiment.
FIG. 6B is a diagram illustrating the mapping table in a state where the drive data layout conversion is performed on an individual chunk basis, according to the first embodiment.

FIG. 6A is a diagram illustrating a drive data layout conversion that is performed on an individual chunk basis, according to the first embodiment. FIG. 6B is a diagram illustrating the mapping table 250 in a state where the drive data layout conversion is performed on an individual chunk basis, according to the first embodiment.

As depicted in FIG. 6A, when the layout of the drive D6 is to be changed, the information 431 regarding the drive D6 in the chunk state management table 260 (FIG. 5) is referenced to acquire information regarding a used area and an unused area of the drive. In the example of FIG. 5, the drive D6 is such that the physical chunk P1 is a used area and that the physical chunks P2 and P3 are unused areas.

For the drive D6, a new layout 512 is created based on the new format, and added to the mapping table 250 (FIG. 6B). In this instance, the physical chunks 310 provided to the logical chunks 330 by the drive D6 remain the same before and after the change from the perspective of the whole drive D6, but differ in areas assigned to the used area.

More specifically, as depicted in the mapping table 250 (FIG. 6B), an old layout 511 based on the old format is such that the physical chunks P1, P2, and P3 are respectively provided to logical chunks L31, L23, and L32. In the case of the new layout 512, too, the physical chunks P1, P2, and P3 are provided to the logical chunks L31, L23, and L32, as is the case with the old layout 511. However, the mapping of the logical chunk L31, which is a used area, is changed. That is, the physical chunks P1, P2, and P3 are respectively provided to the logical chunks L23, L31, and L32.

Subsequently, as depicted in FIG. 6A, the data stored in the physical chunk P1 of the drive D6, which is in the old layout 511, is copied to the physical chunk P2, which is an unused area in the new layout 512 (a copy process 520). In a case where a storage area used by the physical chunks 310 at the copy destination, which is in the new layout 512, is a used area in the old layout 511, the data in the storage area at the copy destination is transferred to another storage area to place the copy destination storage area in the unused state before performing the copy process 520. The copy process 520 is performed to copy the data to another area for the purpose of increasing the redundancy of the redundancy group. Therefore, even when the data stored in the physical chunk P1 of the drive D6, which is in the old layout 511, is discarded, it is possible to keep the redundancy of the data together with the original redundant data. The redundancy of the redundancy group need not necessarily be increased by copying data, and may be increased by increasing the number of pieces of redundant data based on the data.

When the copy process starts, the copy source area of the chunk state management table 260 (FIG. 5) is updated to "conversion from old in progress," and the copy destination area is updated to "conversion to new in progress."

When the copy process is completed on the data stored in the physical chunk P1 in the old layout 511, the copy source area of the chunk state management table 260 is changed to "unused," and the copy destination area is changed to "new."

Subsequently, when all the areas in the old layout 511 of the drive D6 become unused, the old layout 511 based on the old format is deleted from the mapping table 250 and the chunk state management table 260.

Due to a drive data layout conversion process performed on an individual chunk basis, the new layout and the old layout are equal in the data stored in the drives 113 included in the storage node 110, but are different in storage location because of a storage location change. The redundant data is stored in the drives 113 included in a separate storage node 110.

As depicted, for example, in FIGS. 6A and 6B, the new and old layouts are such that data F corresponding to the logical chunk L31 is transferred from the physical chunk P1 of the drive D6 in the storage node N3, which is in the old layout, to the physical chunk P2 of the drive D6, which is in the new layout. However, when a fault occurs in the storage node N3, the data F can be accessed from the physical chunk P2 of the drive D2 in the storage node 110 no matter which physical chunk stores the data F.

(Flow of Drive Data Layout Conversion Process Performed on Individual Chunk Basis)

Figure 7:
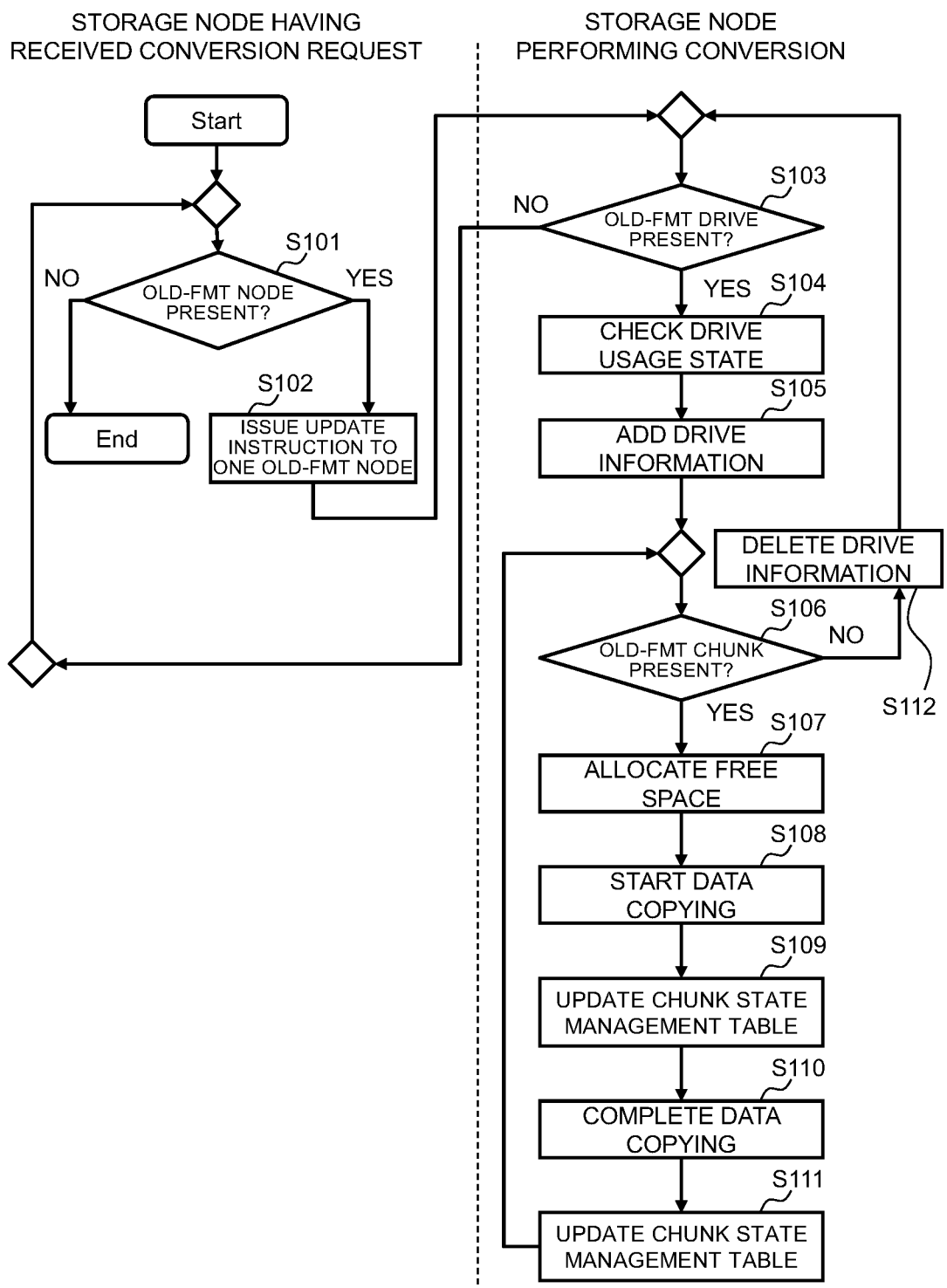
FIG. 7 is a flowchart illustrating a drive data layout conversion process that is performed on an individual chunk basis, according to the first embodiment.

FIG. 7 is a flowchart illustrating a drive data layout conversion process performed on an individual chunk basis. The drive data layout conversion process, which is done on an individual chunk basis, is performed by one of a plurality of storage control programs 220 (FIG. 2) disposed in a plurality of storage nodes 110 belonging to the same redundancy group. Processing in steps S101 and S102 is performed by the storage control program 220 of a storage node 110 that has received a format conversion instruction. Processing in steps S103 to S112 is performed by a storage control program 220 that has received a format update instruction.

First of all, in step S101, the storage control program 220 determines whether a storage node 110 having physical chunks 310 using the old format exists in the redundancy group that performs a format conversion. If a relevant storage node 110 exists ("YES" at step S101), the storage control program 220 proceeds to step S102. Meanwhile, if no relevant storage node 110 exists ("NO" at step S101), the storage control program 220 terminates the drive data layout conversion process that is done on an individual chunk basis.

In step S102, the storage control program 220 specifies the capacity pool and transmits the format update instruction to one of the storage nodes 110 having physical chunks 310 using the old format. The storage node 110 (storage control program 220) at a transmission source of the format update instruction may be the same as or different from the storage node 110 (storage control program 220) at a transmission destination of the format update instruction.

Next, in step S103, the storage control program 220 that has received the format update instruction determines whether a drive 113 using the old format exists in the capacity pool specified by the format update instruction. If a relevant drive 113 exists ("YES" at step S103), the storage control program 220 proceeds to step S104. Meanwhile, if no relevant storage node 110 exists ("NO" at step S103), the storage control program 220 returns to step S101.

In step S104, the storage control program 220 references the chunk state management table 260 to check the drive usage state of the relevant drive 113 that uses the old format. Next, in step S105, the storage control program 220 selects one drive 113 that uses the old format, adds a new layout of the selected drive 113, which is based on a new format, to the mapping table 250, and adds a drive usage state based on the new format to the chunk state management table 260.

Here, the new layout added to the mapping table 250 not only keeps the redundancy, but also assigns logical chunks corresponding to physical chunks used in the old layout to physical chunks corresponding to an unused storage area in the old layout.

Next, in step S106, the storage control program 220 determines whether used physical chunks in the old layout exist in the drive 113 associated with "YES" at step S103. If used physical chunks exist, the storage control program 220 confirms the logical chunks corresponding to the used physical chunks in the old layout. The storage control program 220 then confirms the physical chunks corresponding to the relevant logical chunks. Subsequently, the storage control program 220 checks whether the relevant physical chunks are used in the old layout. If the relevant physical chunks are used in the old layout ("YES" at step S106), the storage control program 220 proceeds to step S107. Meanwhile, if the relevant physical chunks are not used in the old layout ("NO" at step S106), the storage control program 220 proceeds to step S112.

In step S107, the storage control program 220 allocates a free space by transferring the data in the physical chunks used in the old layout to another area. In this instance, the storage control program 220 also changes the mapping between the physical chunks and the logical chunks according to the transfer of the data.

Next, in step S108, the storage control program 220 starts the copy process of copying data in the used physical chunks in the old layout to physical chunks that correspond in the new layout to the logical chunks corresponding to the used physical chunks in the old layout. In the copy process, the storage control program 220 writes the data in the new format at a copy destination. Next, in step S109, the storage control program 220 updates the copy source area of the chunk state management table 260 to "conversion from old in progress," and updates the copy destination area to "conversion to new in progress."

Next, in step S110, the storage control program 220 completes the copy process of copying data.

Next, in step S111, the storage control program 220 changes the copy source area of the chunk state management table 260 to "unused," and changes the copy destination area to "new." Updating the copy source area of the chunk state management table 260 to "unused" is equivalent to discarding the data stored in the copy source area. Upon completion of step S111, the storage control program 222 proceeds to step S106, and determines whether a used physical chunk other than the used physical chunks confirmed in the previously performed step S106 exists.

In step S112, the storage control program 220 deletes the information regarding the relevant drive 113 from the mapping table 250 and chunk state management table 260 based on the old format. Upon completion of step S112, the storage control program 220 proceeds to step S103.

An I/O process performed during a format change will now be described.

When performing an I/O process during a format change, the capacity control program 230 (FIG. 2) references the chunk state management table 260 (FIG. 5). If, in this instance, the chunk state management table 260 contains the information 431 based on the old layout and the information 432 based on the new layout with respect to a drive 113 at an I/O destination, the information 431 based on the old layout is referenced.

The capacity control program 230 selectively uses the old-format control mechanism 231 (FIG. 2) and the new-format control mechanism 232 (FIG. 2) depending on the state of the physical chunks of the drive 113 at the I/O destination.

The capacity control program 230 performs the I/O process by using the old-format control mechanism 231 when the physical chunks 310 at the I/O destination are in the "unused" or "old" state, or by using the new-format control mechanism 232 when the physical chunks 310 at the I/O destination are in the "new" state.

Further, during the copy process (steps S108 to S110 (FIG. 7)), the capacity control program 230 selectively uses the old-format control mechanism 231 and the new-format control mechanism 232 depending on whether a write I/O or a read I/O is performed.

More specifically, when the state of the physical chunks 310 at the I/O destination is "conversion from old in progress," the capacity control program 230 performs a write I/O with respect to the physical chunks 310 at a copy source by using the old-format control mechanism 231. Further, similarly, when the state of the physical chunks 310 at the I/O destination is "conversion from old in progress," the capacity control program 230 performs a write I/O with respect to the physical chunks 310 at the copy destination by using the new-format control mechanism 232.

Meanwhile, when the state of the physical chunks 310 at the I/O destination is "conversion from old in progress," the capacity control program 230 performs a read I/O with respect to the physical chunks 310 at the copy source by using the old-format control mechanism 231.

As described above, the mapping table 250 contains old-layout information based on the old format and new-layout information based on the new format such that the old-format control mechanism 231 and the new-format control mechanism 232 are selectively used. Therefore, even in a case where an old-format area and a new-format area coexist during a data format conversion, the old-format area and the new-format area are both accessible.

An unused area in the old layout is assigned to a storage area serving as the copy destination in the new layout. In a case where logical chunks 330 corresponding to physical chunks 310 in an unused area in the old layout are assigned to the virtual volume 340 and a write I/O occurs during a format change, the physical chunks 310 corresponding to the logical chunks 330 are changed. That is, the physical chunks 310 corresponding to the logical chunks 330 are changed to separate unused physical chunks 310 in the same storage node 110. This subsequently causes a change in the map information regarding the logical chunks 330 with respect to the physical chunks 310 in the mapping table 250 and the chunk state management table 260.

An I/O process during a format change with respect to data discarded for the format change is performed with respect to copying of the discarded data in a case where the discarded data is to be copied to another physical chunk. Meanwhile, in a case where the discarded data is not to be copied to another physical chunk, the I/O process is performed with respect to data recovered from the discarded data according to the redundant data of the discarded data stored in a physical chunk other than the physical chunk targeted for the format change.

Advantage of First Embodiment

When the format of a drive data layout is changed, the storage control program 220 is unable to access data that is stored in a layout based on the old format. Therefore, the data stored in the layout based on the old format is transferred to another area (e.g., physical chunks 310 or storage drive 113), then changed to a layout based on the new format, and stored anew in the new layout.

Further, during a layout conversion, old/new-layout information (mapping table 250) regarding a data storage destination is managed. Upon receiving an I/O request, the storage control program 220 references the old/new-layout information, and executes the I/O request by performing an I/O process based on the layout of a data storage area at the access destination specified by the I/O request.

Consequently, the first embodiment is able to update the storage system 1 for performance improvement, quality enhancement, and function addition requiring a data layout change while continuously performing an I/O process specified by a host. For example, random read performance improves when the data interchange format (DIF) storage method is changed from a separate method to a continuous storage method.

Second Embodiment

A second embodiment of the present invention makes a layout change on an individual drive basis by temporarily disconnecting a drive 113 targeted for a format change from the storage system 1, changing the format of the drive 113, and reconnecting the drive 113 to the storage system 1.

(Drive Data Layout Conversion on Individual Drive Basis)

Figures 8A, 8B:
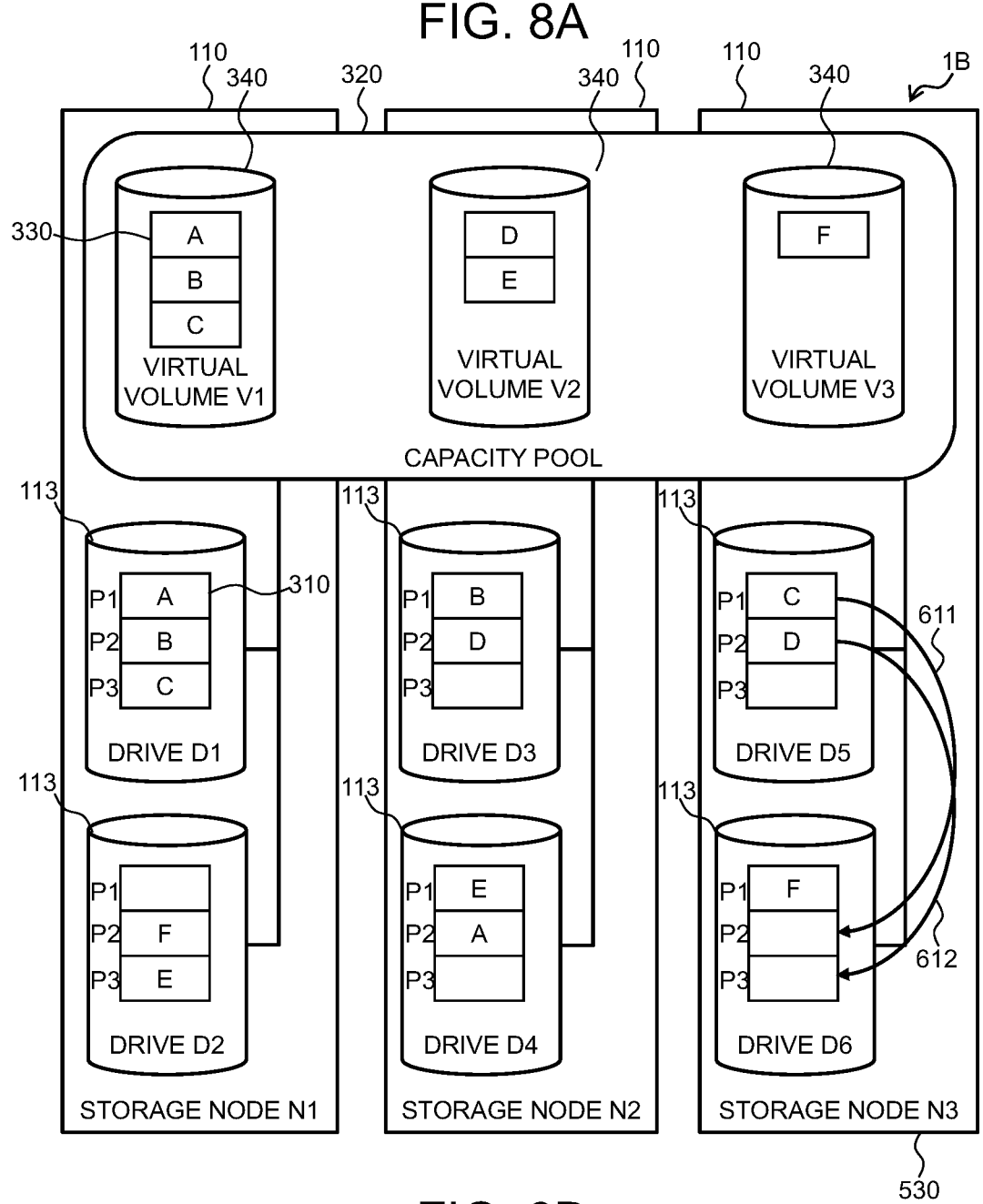
FIG. 8A is a diagram illustrating the drive data layout conversion that is performed on an individual drive basis, according to a second embodiment of the present invention.
FIG. 8B is a diagram illustrating the mapping table in a state where the drive data layout conversion is performed on an individual drive basis, according to the second embodiment.

FIG. 8A is a diagram illustrating a drive data layout conversion that is performed on an individual drive basis. FIG. 8B is a diagram illustrating the mapping table 250 in a state where the drive data layout conversion is performed on an individual drive basis, according to the second embodiment. FIG. 8C is a diagram illustrating the chunk state management table 260 in a state where the drive data layout conversion is performed on an individual drive basis, according to the second embodiment. FIGS. 8A, 8B, and 8C depict an example of a layout conversion of the drive D5.

Data in used physical chunks 310 in a drive 113 targeted for the conversion is transferred to unused physical chunks 310 in another drive 113 in the same storage node N3 as for the drive 113 targeted for the conversion. In the transfer destination drive 113, either the new format or the old format may be used. Further, one or more transfer destination drives 113 may be involved in the conversion.

As depicted, for example, in FIG. 8A, data C stored in the physical chunk P1 of the drive D5 in a storage system 1B according to the second embodiment is copied to the physical chunk P2 of the drive D6 (copy process 611). Further, data D stored in the physical chunk P2 of the drive D5 is copied to the physical chunk P3 of the drive D6 (copy process 612).

When the copy processes 611 and 622 are completed, the information related to the copy source and copy destination physical chunks 310 and stored in the mapping table 250 (FIG. 8B) and the chunk state management table 260 (FIG. 8C) is changed.

Before copying, for example, in the mapping table 250 (FIG. 8B), a logical chunk L13 corresponds to the physical chunk P1 of the drive D5, and a logical chunk L23 corresponds to the physical chunk P2 of the drive D6. After completion of copying, the above correspondence is changed.

Further, in the chunk state management table 260 (FIG. 8C), the states of the physical chunks P1 and P2 of the drive D5 are changed from "old" to "unused." Furthermore, in the chunk state management table 260, the states of the physical chunks P2 and P3 of the drive D6 are changed from "unused" to "old" or "new" depending on the format of the drive 113 (drive D6). As regards all the physical chunks 310 to be copied, the mapping table 250 is similarly changed.

When all pieces of the data stored in the drive D5 are completely copied to the other drive D6 in the same storage node N3, a new layout based on the new format is generated for the drive D5, and the mapping table 250 is changed.

Subsequently, the drive data layout conversion on an individual drive basis is continued until all the drives 113 in the storage node 110 (storage node N3) are in the new layout based on the new format.

When the drive data layout conversion is performed on an individual drive basis, the data storage area is changed to another drive 113 in the same storage node 110 as compared with a state prior to the format conversion. As regards the data whose storage area is changed, data redundancy is kept because the redundant data is stored in the drive 113 in another storage node 110.

An I/O process during the drive data layout conversion is performed in a manner similar to that in the first embodiment.

Further, since a format conversion is performed on the basis of individual drives 113, the chunk state management table 260 may be substituted by a state management table 260B depicted in FIG. 9 as a modification. The state management table 260B provides management on an individual drive basis instead of an individual chunk basis.

(Flowchart of Data Layout Conversion on Individual Drive Basis)

Figure 10:
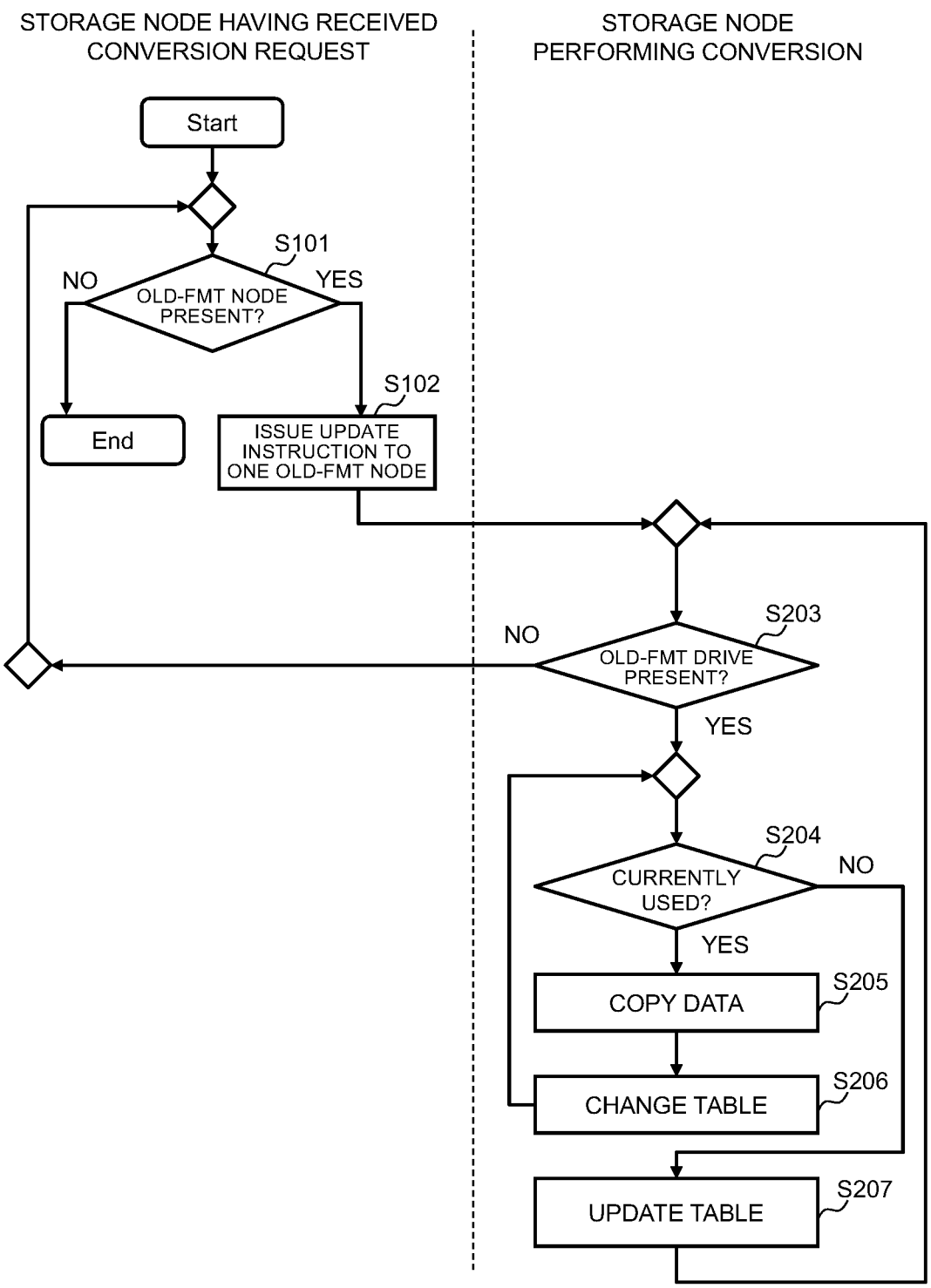
FIG. 10 is a flowchart illustrating the drive data layout conversion process that is performed on an individual drive basis, according to the second embodiment.

FIG. 10 is a flowchart illustrating a data layout conversion process that is performed on an individual drive basis, according to the second embodiment. The data layout conversion process, which is done on an individual drive basis, is performed by one of a plurality of storage control programs 220 (FIG. 2) disposed in a plurality of storage nodes 110 belonging to the same redundancy group. Processing in steps S101 and S102, which is the same as that described in conjunction with the first embodiment, is performed by a storage control program 220 that has received a format conversion instruction. Processing in steps S203 to S207 is performed by a storage control program 220 that has received a format update instruction.

Steps S101, S102, and S203 are the same as steps S101, S102, and S103 described in conjunction with the first embodiment, respectively.

In step S204, the storage control program 220 determines whether physical chunks included in a drive 113 that belongs to the capacity pool specified by the format update instruction and that uses the old format are currently used. If the physical chunks are currently used ("YES" at step S204), the storage control program 220 proceeds to step S205. Meanwhile, if the physical chunks are not currently used ("NO" at step S204), the storage control program 220 proceeds to step S207.

In step S205, the storage control program 220 performs a copy process of copying the data in the physical chunks determined in step S204 to be currently used to another drive 113 in the same storage node 110. In the copy process, the storage control program 220 writes the data at the copy destination in a new format. Upon completion of physical chunk copying, the storage control program 220 proceeds to step S206, and changes the mapping table 250 and the chunk state management table 260 according to a configuration formed after copying. In this instance, updating the copy source area in the chunk state management table 260 to "unused" according to the configuration formed after copying is equivalent to discarding the data stored in the copy source area. Upon completion of step S206, the storage control program 220 returns to step S204.

In step S207, the storage control program 220 changes the mapping table 250 and the chunk state management table 260 according to the new format. Upon completion of step S207, the storage control program 220 returns to step S203.

Advantage of Second Embodiment

Before a data format change, the storage drive 113 or storage node 110 targeted for the data format change is disconnected from the storage system 1B, and then, upon completion of the data format change, the disconnected storage drive 113 or storage node 110 is connected to the storage system 1B. Therefore, a data format conversion can efficiently be performed in an aggregate, such as the storage drive 113 or the storage node 110.

Modification of Second Embodiment

In a modification of the second embodiment, not the drive but the storage node is temporarily disconnected from the storage system 1, and after a format conversion, reconnected to the storage system 1, thereby performing a layout change. In this instance, the mapping is changed after the data stored in all the drives belonging to a capacity pool that is included in the relevant storage node and that has specified redundancy is copied to a drive in another storage node belonging to the capacity pool.

Third Embodiment

In a third embodiment of the present invention, the reception of I/Os is temporarily stopped, and then a format conversion is performed on an individual storage node basis to make a layout change on an individual storage node basis.

Figure 11:
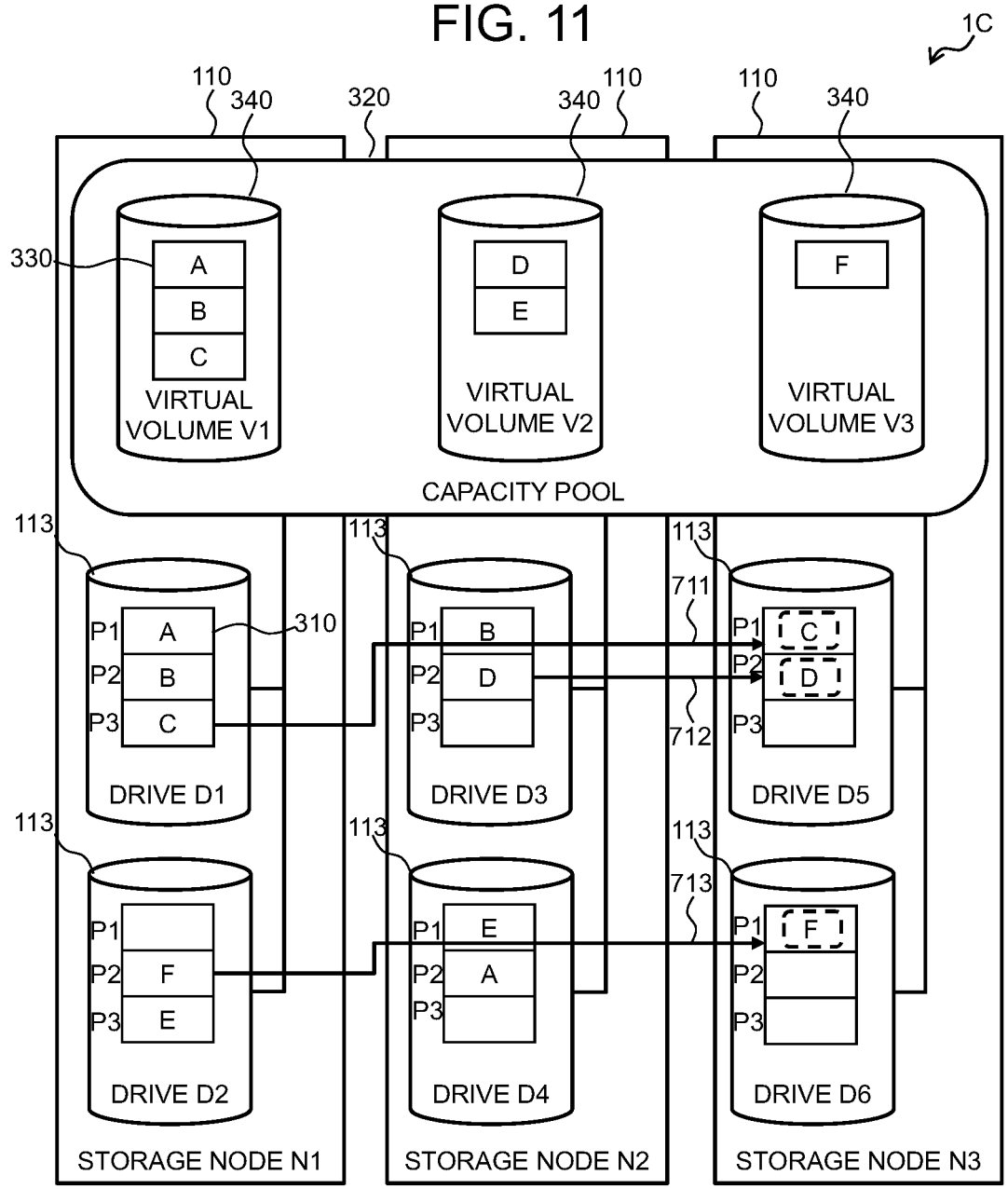
FIG. 11 is a diagram illustrating the drive data layout conversion that is performed on an individual storage node basis, according to a third embodiment of the present invention.

FIG. 11 is a diagram illustrating an example of a data layout conversion that is performed on an individual storage node basis, according to the third embodiment. When a storage node 110 in a cluster stops, a storage system 1C according to the third embodiment performs an I/O process on physical chunks in drives 113 in another storage node 110 belonging to the same redundancy group as the drives 113 in the relevant storage node 110.

For example, in a case where an I/O is issued to a logical chunk 330 corresponding to the master physical chunk 310 existing in a drive 113 in the stopped storage node 110, an I/O is performed with respect to a mirror physical chunk 310 existing in a drive 113 in a storage node 110 that is not stopped. When the stopped storage node 110 returns to the cluster, the I/O destination is changed to the master physical chunk 310.

In the above instance, in order to ensure that the data stored in the master physical chunk 310 and the data stored in the mirror physical chunk 310 agree with each other, the data is copied to the master physical chunk 310 in the stopped storage node 110 from the corresponding mirror physical chunk 310. Meanwhile, the data is copied to a mirror physical chunk in the stopped storage node 110 from the master physical chunk 310 in another corresponding storage node 110. This function is referred to as the rebuild function.

Alternatively, a data difference that has occurred between stop and recovery is copied to the physical chunk 310 in the stopped storage node 110. This function is referred to as the difference rebuild function.

The present embodiment causes the storage node 110 to stop the reception of I/Os, and then uses the rebuild function (or the difference rebuild function) to perform a layout conversion on an individual storage node basis.

FIG. 11 illustrates an example of a layout conversion of the storage node N3.

First of all, the I/O reception of the storage node N3 targeted for the conversion is stopped. In a case where an I/O is issued during the layout conversion with respect to a physical chunk 310 whose master exists in a drive 113 in the storage node N3, the I/O is performed with respect to a mirror physical chunk 310 on the basis of the behavior of the stopped storage node N3.

When the I/O reception of the storage node N3 is stopped, the format used by a drive 113 belonging to the target redundancy group is converted to update the layout of the mapping table 250. When the layout update of the mapping table 250 is completed, the storage node N3 resumes I/Os. On the basis of the behavior of the storage node N3, which has resumed the I/Os, the I/O destination is changed to the master physical chunk 310 in the storage node N3 in the new format.

Further, when the I/Os resume, all pieces of the data in the mirror physical chunk 310 are reflected in the master physical chunk 310 in the storage node N3 in the new layout.

For example, in a case where master data C, data D, and data F are stored in the storage node N3 before the I/Os are stopped (refer to 530 in FIG. 11), data C, data D, and data F in the mirror physical chunks 310 are copied to the storage node 110 (storage node N3) when the I/Os are resumed (copy processes 711, 712, and 713).

In the present embodiment, too, the state management table 260B (FIG. 9), which provides management on an individual drive basis and not on an individual chunk basis, may be used instead of the chunk state management table 260. Further, a state management table 260C (FIG. 12) may be used instead of the chunk state management table 260. The state management table 260C provides management on an individual node basis and not on an individual drive basis.

(Flowchart of Data Layout Conversion on Individual Storage Node Basis)

FIG. 13 is a flowchart illustrating the data layout conversion process that is performed on an individual storage node basis, according to the third embodiment. The data layout conversion process, which is done on an individual storage node basis, is performed by one of a plurality of storage control programs 220 (FIG. 2) disposed in a plurality of storage nodes 110 belonging to the same redundancy group. Processing in steps S101 and S102, which is the same as that described in conjunction with the first and second embodiments, is performed by a storage control program 220 that has received the format conversion instruction. Processing in steps S303 to S308 is performed by a storage control program 220 that has received the format update instruction.

Steps S101 and S102 are the same as those described in conjunction with the first and second embodiments.

In step S303, the storage control program 220 having received the format update instruction stops the reception of I/Os with respect to a capacity pool specified by the format update instruction. Next, in step S304, the storage control program 220 changes the mapping table 250 of the capacity pool specified by the format update instruction. For example, in a case where the storage node 110 includes the drive D5 and the drive D6, the layout of these two drives 113 is changed to a new layout based on the new format.

Next, in step S305, the storage control program 220 updates the chunk state management table 260 of the capacity pool specified by the format update instruction. For example, in a case where the storage node 110 includes the drive D5 and the drive D6, the state information regarding the physical chunks in these two drives 113 is changed from "old" to "new." In this instance, updating the copy source area of the chunk state management table 260 to "new" according to the configuration formed after copying is equivalent to discarding "old" data stored in the copy source area.

Next, in step S306, the storage control program 220 reports the updates of the mapping table 250 and the chunk state management table 260, to the other storage nodes 110 belonging to the same redundancy group as the capacity pool specified by the format update instruction. Next, in step S307, the storage control program 220 resumes the reception of I/Os, which has been stopped in step S303.

Next, in step S308, the storage control program 220 performs a rebuild process. Specifically, the rebuild process is performed in such a manner that the data in the mirror physical chunks 310 in the other storage nodes 110 is copied to the master physical chunk 310 in the storage node 110 targeted for the format change. In this copy process, the storage control program 220 writes the data to the copy destination in the new format. Further, the master physical chunks 310 in the other storage nodes 110 are copied to the mirror physical chunks 310 in the storage node 110 targeted for the format change. Upon completion of step S308, the storage control program 220 returns to step S101.

Advantage of Third Embodiment

When a data format is to be changed, the reception of I/O requests to the storage node 110 or storage drive 113 targeted for the data format change is stopped, and the mapping table 250 is updated according to the changed data format. When the update of the mapping table 250 is completed, the reception of I/O requests is resumed. Further, the data discarded from the storage area targeted for the data format change is recovered by exercising the rebuild function for the data. Consequently, since a format conversion is performed in an aggregate, such as the storage drive 113 or the storage node 110, and recovery is achieved by exercising the rebuild function for originally existing redundant data, a data format conversion can efficiently be performed with a simple configuration.

Modification of Third Embodiment

In a modification of the third embodiment, the reception of I/Os can be stopped on an individual drive basis, and not on an individual node basis, and a layout change can be made on an individual drive basis. In this case, too, data recovery is achieved by exercising the rebuild function or the difference rebuild function after drive recovery.

The present invention is not limited to the foregoing embodiments, and extends to various modifications. For example, the foregoing embodiments have been described in detail to facilitate the understanding of the present invention, and are not necessarily limited to configurations including all the described components. Further, unless inconsistency arises, some of the components in a certain embodiment may be replaced by the components in another embodiment, and some or all of the components in a certain embodiment may be added to some or all of the components in another embodiment. Further, some of the components in each embodiment may be subjected to addition, deletion, replacement, integration, or dispersion. Moreover, the components and processes described in conjunction with the embodiments may be dispersed, integrated, or interchanged as appropriate based on its processing efficiency or implementation efficiency.

What is claimed is:

1. A storage system comprising:
a plurality of nodes,
wherein the nodes each include
a storage drive, and
a processor that processes data that is to be stored in the storage drive in response to an input/output request from a host,
the processor included in the node creates a redundancy group for forming a redundant configuration of the data to be stored in the storage drive, and stores data of the redundancy group in a plurality of the storage drives, and
when changing a data format of a unit storage area, the processor included in the node
discards data stored in the unit storage area where part of the data of the redundancy group is stored,
based on the data of the redundancy group that is stored in an area other than the unit storage area where the data format is to be changed, recovers the discarded data according to a changed data format and re-stores the recovered data in the storage drive, and
performs an input/output process on the data to be discarded during the data format change, by achieving recovery based on the data of the redundancy group that is stored in an area other than the unit storage area where the data format is to be changed.

2. The storage system according to claim 1,
wherein, after the data format change, a processing destination of the input/output process is changed to the unit storage area.

3. The storage system according to claim 1,
wherein the processor included in the node increases redundancy of the redundancy group before discarding the data stored in the unit storage area targeted for the data format change.

4. The storage system according to claim 3,
wherein the processor included in the node
increases the redundancy of the redundancy group by copying the data to be discarded,
based on the copied data, recovers the discarded data in the changed data format and re-stores the recovered data in the storage drive, and
based on the copied data, performs the input/output process on the data to be discarded during the data format change.

5. The storage system according to claim 3,
wherein the redundancy group includes the data to be stored in the storage drive and redundant data that is created based on the data to be stored in the storage drive, and
the processor included in the node increases the redundancy of the redundancy group by increasing a number of pieces of redundant data for the data to be stored in the storage drive.

6. The storage system according to claim 2,
wherein the processor included in the node
performs an input/output process to be performed before and during the data format change, by executing a program that performs an input/output process on the data based on an unchanged data format, and
performs an input/output process to be performed after the data format change, by executing a program that performs an input/output process on the data based on the changed data format.

7. The storage system according to claim 1,
wherein the unit storage area is set in association with the storage drive or the node, and
the processor included in the node,
before the data format change, disconnects the storage system from the storage drive or the node that is associated with the unit storage area targeted for the data format change, and
after completion of the data format change, connects the storage system to the disconnected storage drive or node.

8. The storage system according to claim 1,
wherein the unit storage area is set in association with the node or the storage drive, and
the processor included in the node,
when making the data format change, stops the input/output process on the node or the storage drive that is targeted for the data format change, and
after completion of the data format change, resumes the input/output process.

9. A data layout conversion method in a storage system that is exercised by the storage system including a plurality of nodes,
wherein the nodes each include
a storage drive, and
a processor that processes data that is to be stored in the storage drive in response to an input/output request from a host,
the processor included in the node creates a redundancy group for forming a redundant configuration of the data to be stored in the storage drive, and stores data of the redundancy group in a plurality of the storage drives, and
when changing a data format of a unit storage area, the processor included in the node
discards data stored in the unit storage area where part of the data of the redundancy group is stored,
based on the data of the redundancy group that is stored in an area other than the unit storage area where the data format is to be changed, recovers the discarded data according to a changed data format and re-stores the recovered data in the storage drive, and
performs an input/output process on the data to be discarded during the data format change, by achieving recovery based on the data of the redundancy group that is stored in an area other than the unit storage area where the data format is to be changed.

* * * * *